T. N. FLETCHER.
MILKING MACHINE TEAT CUP.
APPLICATION FILED DEC. 8, 1915.
1,195,572.
Patented Aug. 22, 1916.
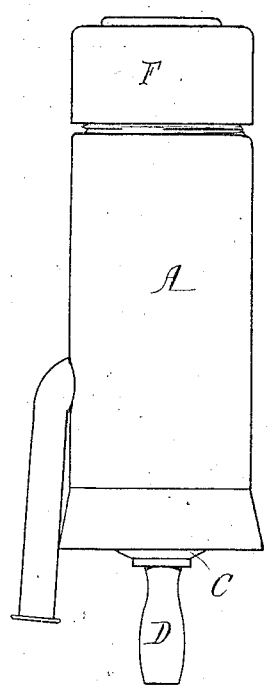
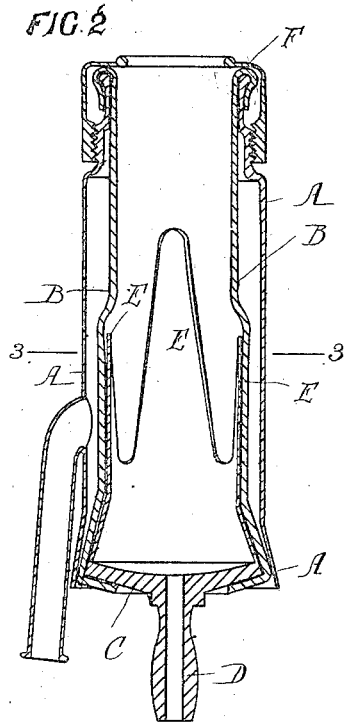
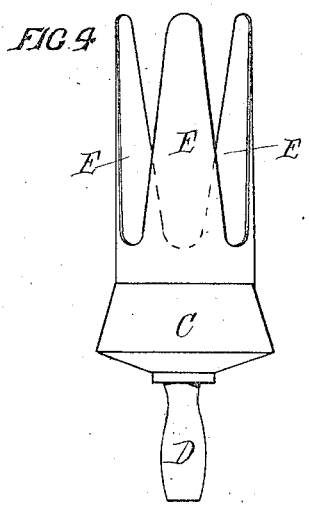
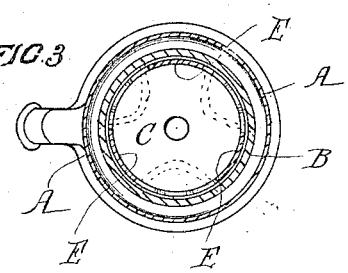
INVENTOR:
THOMAS NOTON FLETCHER
BY: *[signature]*
ATTORNEY

UNITED STATES PATENT OFFICE.

THOMAS NOTON FLETCHER, OF HAMILTON, NEW ZEALAND.

MILKING-MACHINE TEAT-CUP.

1,195,572.  Specification of Letters Patent.  Patented Aug. 22, 1916.

Application filed December 8, 1915. Serial No. 65,710.

*To all whom it may concern:*

Be it known that I, THOMAS NOTON FLETCHER, subject of the King of Great Britain, residing at Hamilton, Auckland, New Zealand, have invented a new and useful Improved Milking-Machine Teat-Cup; and I do hereby declare the following to be a full, clear, and exact description of the same.

This invention relates to an improvement in milking machine teat cups of that class in which a rigid casing is combined with a tubular flexible rubber lining secured at its top and bottom ends within the casing and which lining in the operation of the teat is caused to alternately close upon and release the teat placed within it in the well known manner.

The invention has been designed in order to provide means whereby such lining (or inflation, as it is generally termed) will be caused to close in on to the teat at three equidistant points around it, when inflated and thereby to exert a pressure down the teat length at corresponding points. The construction of the means devised for effecting this purpose is also such as to cause such engagements with the teat to take place first near the upper end of the cup and gradually to work down to the lower end.

The means designed for carrying out the invention consist in a cup fitting adapted to enter and close the bottom end of the inflation and formed with the usual nipple fitting to receive the milk tube connection. This cup will be held in position in any suitable manner, for instance by jamming into the inflation end, or by means of a screw collar cap fitting over the casing bottom. The fitting is formed with three spring arms or prongs extending upward from points equidistant apart in its circumference and extending right up to near the top end of the cup. Each of these spring arms or prongs is shaped with a wide base narrowing to its top edge.

In the accompanying drawings:—Figure 1 is an elevation, and Fig. 2 a sectional elevation of the improved teat cup. Fig. 3 is a sectional plan taken on the line 3—3 of Fig. 2. Fig. 4 is an elevation of the pronged fitting forming the special feature of this invention.

A is the usual casing and B the inflation which are made on the common general lines.

C is the cup shaped fitting that is adapted to fit into the bottom end of the casing and to fasten and hold the inflation between it and the casing by wedging therein in the manner shown in Figs. 1 and 2. This cup is provided with the ordinary nipple extension D to receive the milk tube connection with the claw. In this invention it is also formed with the three upwardly extending spring arms or prongs E each one of which is made to taper to a blunt point at its top end and which prongs are situated at even circumferential distances apart and fit closely upon the inside of the inflation B. The upper end of the inflation is secured to the casing in any approved manner, as for instance by being turned down around its top edge and secured by the screw cap or mouthpiece F.

It will be seen that when the inflation B is inflated by the admission of air to the space between it and the casing in the well known way, the prongs E will serve to keep back the portions of the inflation with which they engage, so that those portions between them will bulge inward in the manner shown by the dotted lines in Fig. 3. Then also by reason of the wider spaces between the prongs at the top ends and the prongs being weaker at such ends, the resistance to the inward movements will be less there and gradually increase downward so that the inward movement will commence at the top and gradually work down. Thus a three cornered squeeze will be exerted on the teat within the cup, such squeeze serving to keep the teat centered and to express the milk from it by the downward squeezing action imparted thereto.

I claim:—

1. In milking machine teat cups, the combination with a casing and a rubber lining or inflation fitted therein, of a cup shaped device having the milk nipple attached fitting within the bottom end of the lining and formed with three upwardly extending spring prongs arranged to lie against the inside of the lining at equal circumferential distances around it, substantially as and for the purposes herein specified.

2. In milking machine teat cups, the combination with a casing and a rubber lining or inflation fitted therein, of three spring prongs fixed at their bottom ends and extending upward inside the lining at equal circumferential distances apart, each of such prongs being shaped with sides tapering to a blunt point at its top end, substantially as and for the purposes herein specified.

In testimony whereof, I have signed this specification in the presence of two subscribing witnesses.

THOMAS NOTON FLETCHER.

Witnesses:
EDWARD VAROBE-SMITH,
ETHEL FRANCES COURTNEY.